United States Patent
Huelsen et al.

(10) Patent No.: US 11,922,920 B2
(45) Date of Patent: Mar. 5, 2024

(54) ROOF MODULE COMPRISING A ROOF SKIN

(71) Applicant: Webasto SE, Stockdorf (DE)

(72) Inventors: Michael Huelsen, Stockdorf (DE); Oliver Heisel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 64 days.

(21) Appl. No.: 17/155,816

(22) Filed: Jan. 22, 2021

(65) Prior Publication Data
US 2021/0241752 A1  Aug. 5, 2021

(30) Foreign Application Priority Data
Jan. 30, 2020 (DE) ...................... 10 2020 102 304.9

(51) Int. Cl.
| | |
|---|---|
| *G10K 15/04* | (2006.01) |
| *B60R 13/02* | (2006.01) |
| *B60W 60/00* | (2020.01) |
| *B62D 25/06* | (2006.01) |

(Continued)

(52) U.S. Cl.
CPC .......... *G10K 15/04* (2013.01); *B60R 13/0212* (2013.01); *B60W 60/001* (2020.02); *B62D 25/06* (2013.01); *G10K 11/162* (2013.01); *H04R 1/025* (2013.01); *B60W 2420/54* (2013.01); *H04R 2499/13* (2013.01)

(58) Field of Classification Search
CPC ............................ H04R 3/005; H04R 2499/13
USPC ..................... 381/86, 56, 122, 355
See application file for complete search history.

(56) References Cited

U.S. PATENT DOCUMENTS

| | | |
|---|---|---|
| 7,050,593 B1 | 5/2006 | Emerling |
| 10,099,630 B1 | 10/2018 | Krishnan |
| 10,140,970 B1 | 11/2018 | Valeri |

(Continued)

FOREIGN PATENT DOCUMENTS

| | | |
|---|---|---|
| CN | 103832331 A | 6/2014 |
| CN | 106347173 A | 1/2017 |

(Continued)

OTHER PUBLICATIONS

Examination report dated Feb. 1, 2023, for companion application in Germany (German with English machine translation); 17 pages.

(Continued)

*Primary Examiner* — Alexander Krzystan
(74) *Attorney, Agent, or Firm* — Fitch, Even, Tabin & Flannery, LLP

(57) ABSTRACT

A roof module for a motor vehicle having a roof skin and a roof substructure as well as a means for autonomous driving or semi-autonomous driving of the motor vehicle. The means having at least one sensor module having at least one environmental sensor for detecting a vehicle environment, the sensor module being covered by the roof skin, having a means for generating sound which are covered by the roof skin and means for recording sound which are covered by the roof skin. The environmental sensor and the means for generating sound and the means for recording sound are connected to a controller which is part of the means for autonomous driving or semi-autonomous driving of the motor vehicle. The means for generating sound and the means for recording sound are part of the means for autonomous driving or semi-autonomous driving of the motor vehicle.

15 Claims, 4 Drawing Sheets

(51) Int. Cl.
 G10K 11/162 (2006.01)
 H04R 1/02 (2006.01)

(56) References Cited

U.S. PATENT DOCUMENTS

| | | | |
|---|---|---|---|
| 2009/0169031 A1* | 7/2009 | Iimori | B60R 11/0217 381/86 |
| 2016/0355125 A1 | 12/2016 | Herbert | |
| 2017/0291539 A1 | 10/2017 | Avery | |
| 2018/0037267 A1 | 2/2018 | Williams | |
| 2018/0039283 A1* | 2/2018 | Srivastava | G01S 7/003 |
| 2018/0120863 A1* | 5/2018 | Barra | B62D 37/02 |
| 2018/0261912 A1* | 9/2018 | Mizuno | H01Q 1/32 |
| 2018/0265019 A1* | 9/2018 | Dry | B60R 16/0232 |
| 2019/0162090 A1 | 5/2019 | Rüegg | |
| 2019/0220248 A1 | 7/2019 | Cordourier Maruri | |
| 2020/0168200 A1 | 5/2020 | Pognon | |
| 2021/0107494 A1* | 4/2021 | Silver | G01C 21/3658 |
| 2021/0241752 A1* | 8/2021 | Huelsen | B60W 60/001 |

FOREIGN PATENT DOCUMENTS

| | | |
|---|---|---|
| CN | 107272077 A | 10/2017 |
| CN | 107672597 A | 2/2018 |
| CN | 108699934 A | 10/2018 |
| CN | 110476205 A | 11/2019 |
| DE | 10340853 A1 | 3/2005 |
| DE | 60021269 T2 | 12/2005 |
| DE | 202015001340 U1 | 5/2016 |
| DE | 102018115502 A1 | 1/2019 |
| DE | 102019001618 A1 | 8/2019 |
| DE | 102019122214 A1 | 2/2021 |
| EP | 0913751 A1 | 5/1999 |
| WO | 1997016048 A | 5/1997 |

OTHER PUBLICATIONS

Office Action form companion Chinese Application No. 202110141394.2; dated Dec. 8, 2023; in Chinese with English Machine translation (18 pages).

* cited by examiner

ROOF MODULE COMPRISING A ROOF SKIN

CROSS-REFERENCE TO RELATED APPLICATION

This application claims priority from German Patent Application Number DE 10 2020 102 304.9, filed Jan. 30, 2020, which is hereby incorporated herein by reference in its entirety for all purposes.

FIELD

The invention relates to a roof module for a motor vehicle, in particular for a passenger vehicle, the roof module comprising the features of claim 1.

BACKGROUND

A roof module of this kind is known from practice and is in particular part of a vehicle roof of a passenger vehicle. The roof module, which is a separate component, can be placed on roof side beams, which are part of a vehicle body forming a vehicle body shell, the roof module thereby forming the vehicle roof together with the roof side beams. The roof module has a roof substructure which can comprise a roof frame which forms an interface between the roof module and the roof side beams. A roof skin, which forms a visible outer surface of the roof module, is disposed on the roof substructure. The roof module can be a purely solid roof element which has a transparent roof portion if realized as a panoramic roof, said transparent roof portion forming a see-through roof portion. The roof skin can be transparent in some areas so as to realize the see-through roof portion. Alternatively, the roof module can be provided with a roof opening system having a displaceable lid element by means of which a roof opening can be opened or closed at will. The roof skin of a roof module having a roof opening system extends as far as to the roof opening.

In particular motor vehicles driven by an electric motor and/or autonomously driving motor vehicles present the problem that the driving vehicle is hardly audible to the environment, thus posing a risk to other road users. Autonomously driving vehicles present the additional problem that ambient sounds are not considered sufficiently in terms of driving behavior. This, too, can lead to danger to other road users.

SUMMARY

The object of the invention is to provide a roof module of the kind described above which allows improved sonic communication between the vehicle in question and the vehicle environment.

According to the invention, this object is attained by the roof module having the features of claim 1.

Therefore, a roof module for a motor vehicle, in particular for a passenger vehicle, is proposed according to the invention, the roof module comprising a roof skin and a roof substructure, means for generating sound which are partially or entirely covered by the roof skin and/or means for recording sound which are partially or entirely covered by the roof skin being additionally integrated.

Since the means for generating sound and/or the means for recording sound are integrated, the roof module according to the invention allows the motor vehicle in question to communicate with the vehicle environment in an integrated manner while the optical appearance is unchanged or changed marginally at the most compared to a roof module without the means according to the invention.

For example, the means for generating sound serve to emit warning signals in hazardous situations and/or to emit an audible driving sound or motor sound of the vehicle in question and/or to communicate with other road users—via speech, for example—and/or to generate other sounds. This increases traffic safety in particular of autonomously driving motor vehicles and/or vehicles having an electric drive. Active communication with the environment and with other road users is possible when driving commences or ends, for example, with an option of voicing instructions, confirmations, requests and the like. Communication with visually impaired road users is possible, as well.

The means for generating sound, which are covered by the roof skin and which are sound-generating components, comprise at least one loudspeaker, for example, which can emit sounds, such as a standard driving noise or warning signals, when the vehicle in question is driving.

Alternatively or additionally, the means for generating sound can also be realized as what is known as an exciter and can in particular comprise a vibration generator which can cause a body of the roof module to vibrate, these vibrations being audible on the outside of the vehicle. The body caused to vibrate by the vibration generator is the roof skin, for example. This means that the vibration generator is coupled with the roof skin in this case. Of course, the vibration generator can also be used to cause other roof components to vibrate, such as a lid of a sensor and/or an antenna, a panel and/or the like.

According to a preferred embodiment of the roof module according to the invention, acoustic insulation is disposed between the roof skin and a roof headliner, the roof headliner forming the underside of the roof module, in order to keep the noise emitted by the sound generating means low in the vehicle interior. The acoustic insulation can be an insulating mat, which can be made of a foam material. A double-wall or sandwich roof skin can also be used, which insulates the interior from structure-borne sound excited in the outer layer of the roof skin.

The roof module according to the invention is in particular a roof sensor module (RSM), which is part of an autonomously or semi-autonomously driving motor vehicle when installed. In this case, the roof module according to the invention preferably comprises a means for autonomous driving or semi-autonomous driving of the motor vehicle, said means comprising at least one sensor module having at least one environmental sensor for detecting a vehicle environment, the sensor module being preferably covered by the roof skin.

In a roof module realized as a roof sensor module within the meaning above, the means for generating sound and/or the means for recording sound are preferably also part of the means for autonomous driving or semi-autonomous driving of the motor vehicle.

In the context at hand, a panel or a housing of the sensor module, which is placed on a basic roof skin, is also considered part of the roof skin. So the means for generating sound and/or the means for recording sound can basically also be disposed underneath the panel or within the housing of the sensor module, in which case they are covered by the roof skin portion formed by the panel or the housing.

A vehicle provided with the roof sensor module and constituting an autonomously driving vehicle will drive autonomously at least without substantial interference by a driver when in an autonomous driving mode. In a motor vehicle operated in a semi-autonomous driving mode, the roof module according to the invention can form part of a driver assistance system, for example. In an integrated manner, the roof sensor module (RSM) forms a constructional element in which components are incorporated that are required for autonomous or semi-autonomous driving of the motor vehicle in question. The roof module, which can comprise a plurality of functional elements, constitutes a compact structural unit which a vehicle manu-facturer can connect to a vehicle body or a vehicle body shell comprising roof side beams between which the roof module is accommodated in order to realize a vehicle roof.

The means for recording sound are realized in particular as a microphone and can detect environmental or traffic situations in cooperation with a control unit of the means for autonomous driving or semi-autonomous driving of the motor vehicle.

For instance, other vehicles can be detected based on their noise behavior. Also, ambulances, police officers, pedestrians and other people or objects emitting sound can be analyzed, allowing interaction between the vehicle and the environment based on an exchange of sounds.

In principle, the roof module according to the invention can have an entirely solid roof skin or be provided with a roof opening system which can selectively open or close a roof opening formed in the roof module by means of a lid element. Additionally, a see-through roof portion, which is a transparent portion of the solid roof, can be realized in the roof skin.

The roof module according to the invention is in particular part of a passenger vehicle, but it can also be employed in a utility vehicle, which can be realized as a delivery vehicle, an autonomously driving small bus-type vehicle, such as what is known as a people mover, or as a tractor unit of a heavy-goods vehicle, for example. Also, the roof module can be used in a rail-bound or water-bound vehicle.

The invention also relates to a motor vehicle which comprises a roof module of the kind described above and which is in particular realized as an autonomously or semi-autonomously driving vehicle. The vehicle can basically be any type of road-, rail- or water-bound vehicle. Preferably, however, it is realized as a passenger vehicle or as a utility vehicle and can be equipped with an electric drive and/or a combustion engine.

Other advantages and advantageous embodiments of the subject matter of the invention are apparent from the description, the drawing and the claims.

Examples of embodiments of a motor vehicle comprising a roof module according to the invention are illustrated in the drawing in a schematically simplified manner and will be explained in more detail in the following description.

BRIEF DESCRIPTIONS OF THE DRAWINGS

DETAILED DESCRIPTION

Figure 1:
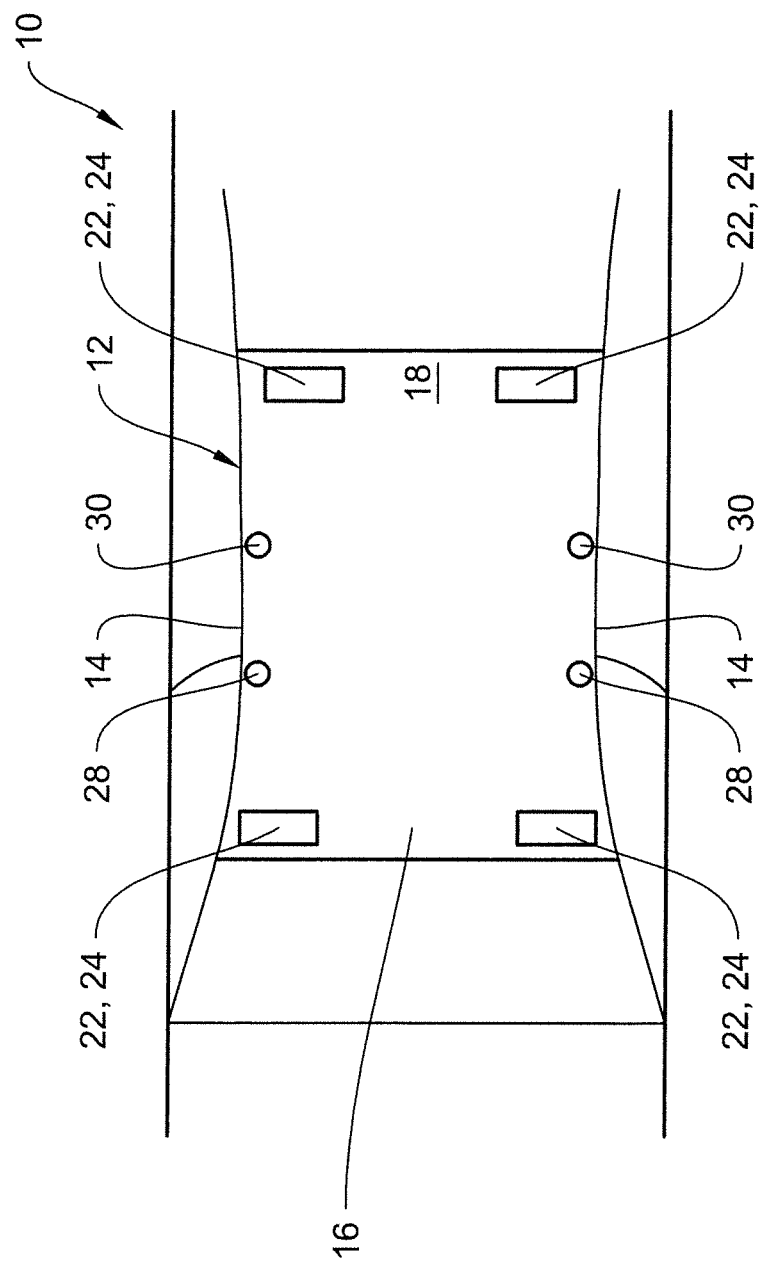
FIG. 1 is a top view of a roof portion of a motor vehicle, the roof portion being provided with a roof module according to the invention.
Figure 2:
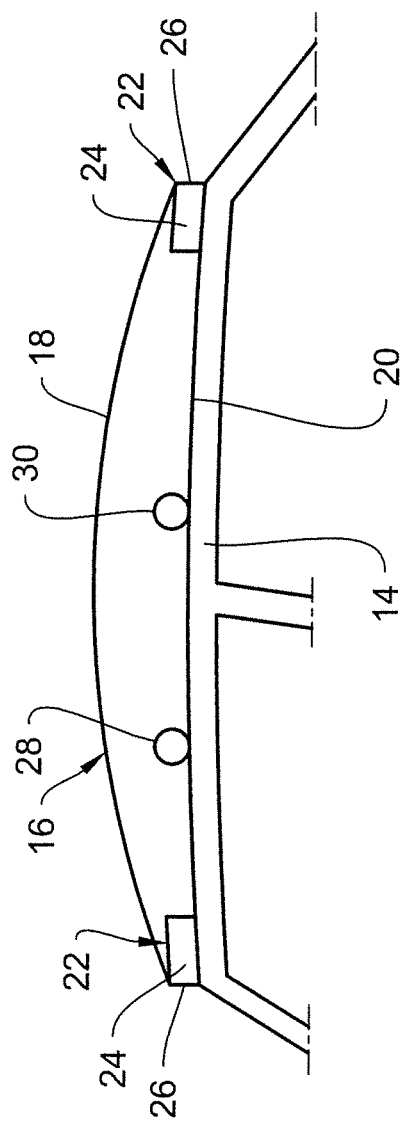
FIG. 2 is a longitudinal section through the roof portion illustrated in FIG. 1.

FIGS. 1 and 2 show a motor vehicle 10 realized as a passenger vehicle and having a vehicle roof 12 comprising a roof beam 14 on either side of a vertical longitudinal center plane of the roof and having a roof module 16 disposed between the two roof beams 14 and permanently attached to them. Roof beams 14 are part of a vehicle body shell. Motor vehicle 10 is equipped with an electric motor and/or a combustion engine as a drive.

Roof module 16 comprises a roof skin 18 disposed on a roof frame 20, roof frame 20 being a support structure or a roof substructure of roof module 16 and forming an interface between the latter and the vehicle body shell, i.e., the roof beams 14.

Roof module 16 is a roof sensor module (RSM) equipped with a means allowing autonomous driving of motor vehicle 10 and comprising a sensor module 22 in each of the four corner portions of roof module 16, each sensor module 22 having at least one environmental sensor 24 by means of which the vehicle environment can be detected so as to realize the autonomous driving of motor vehicle 10.

Sensor modules 22 are disposed on roof frame 20 and connected to a controller (not shown) coupled with the drive and control means of the vehicle. As shown in FIG. 2 in particular, sensor modules 22 are covered by roof skin 18, roof skin 18 forming a side wall 26 in the area of each sensor module 22, side walls 26 forming sensor see-through portions for respective environmental sensors 24. So side walls 26 of roof skin 18 form panels for sensor modules 22.

Environmental sensors 24 can be realized in a variety of ways and can comprise a LiDAR sensor, a radar sensor, a camera and/or another suitable sensor. Side walls 26 of roof skin 18, which form sensor see-through portions, are transparent to the wavelengths used by the environmental sensors and in particular for electromagnetic radiation in a wavelength range between 200 nm and 2000 nm and/or for radar radiation.

Roof module 16 comprises a loudspeaker 28 and a microphone 30 on either side of the vertical longitudinal center plane of the roof for communicating with the vehicle environment. Loudspeakers 28, which are means for generating sound, and microphones 30, which are means for recording sound, are also covered by roof skin 18 and form part of the means for autonomous driving of motor vehicle 10. Hence, they are also connected to the controller of motor vehicle 10, the controller taking sensor signals of environmental sensors 24 and noise signals recorded by means of microphones 30 into account when controlling motor vehicle 10. The controller can detect a current traffic situation by evaluating the measuring signals of environmental sensors 24 and microphones 30, allowing motor vehicle 10 to autonomously adapt to the current traffic situation and behave accordingly. Driving noises are made audible to the environment via loudspeakers 28 when the motor vehicle is driving and/or warning signals are emitted via loudspeakers 28, if necessary.

Figure 3:
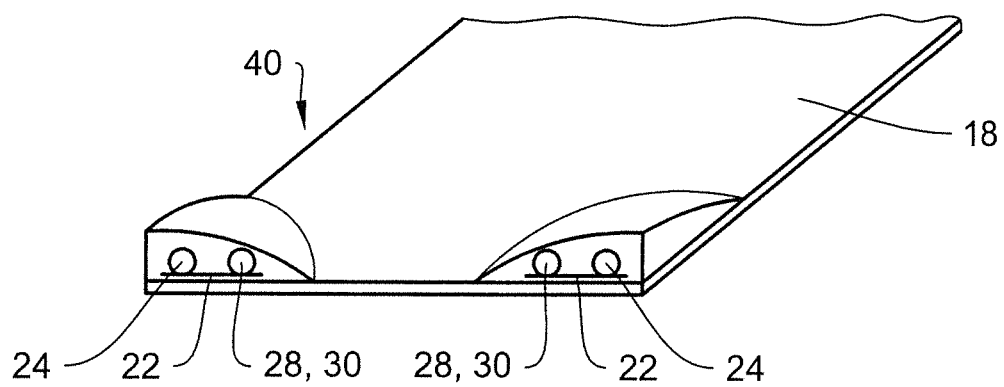
FIG. 3 is a perspective front view of an alternative embodiment of a roof module according to the invention.

FIG. 3 shows a roof module 40, which is an alternative embodiment but is largely identical to the roof module of FIGS. 1 and 2. Roof module 40 differs from the roof module of FIGS. 1 and 2 in that it comprises loudspeakers 28 and/or microphones 30 which are part of sensor modules 22 and disposed on a shared sensor support with respective environmental sensors 24, the sensor support being placed on roof frame 20. Like the loudspeakers of the embodiment of FIGS. 1 and 2, loudspeakers 28 and/or microphones 30 are part of the means for autonomous driving of the motor vehicle.

Roof module 40 is otherwise identical to the roof module of FIGS. 1 and 2, which is why reference is made to the description thereof.

Figure 4:
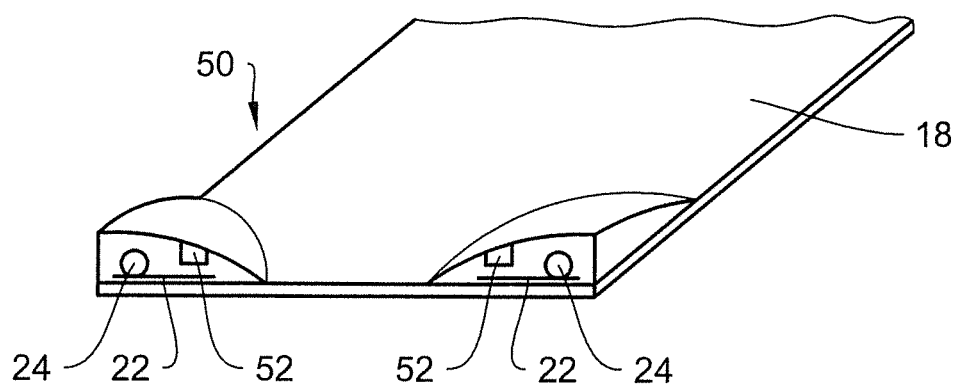
FIG. 4 is a view of another embodiment of a roof module according to the invention and corresponds to FIG. 3.

FIG. 4 shows a roof module 50, which is also largely identical to the roof module of FIGS. 1 and 2 but differs from it in that it comprises vibration generators 52 instead of loudspeakers as means for generating sound, vibration generators 52 being part of sensor modules 22 and connected to the underside of roof skin 18 in the area of sensor modules 22. Vibration generators 52, which are part of the means for autonomous driving, can cause roof skin 18 to vibrate in the area of sensor modules 22 in such a manner that roof skin 18 can emit sounds. That is, structure-borne sound is excited.

Roof module 50 is otherwise identical to the roof module of FIGS. 1 and 2, which is why reference is made to the description thereof.

Figure 5:
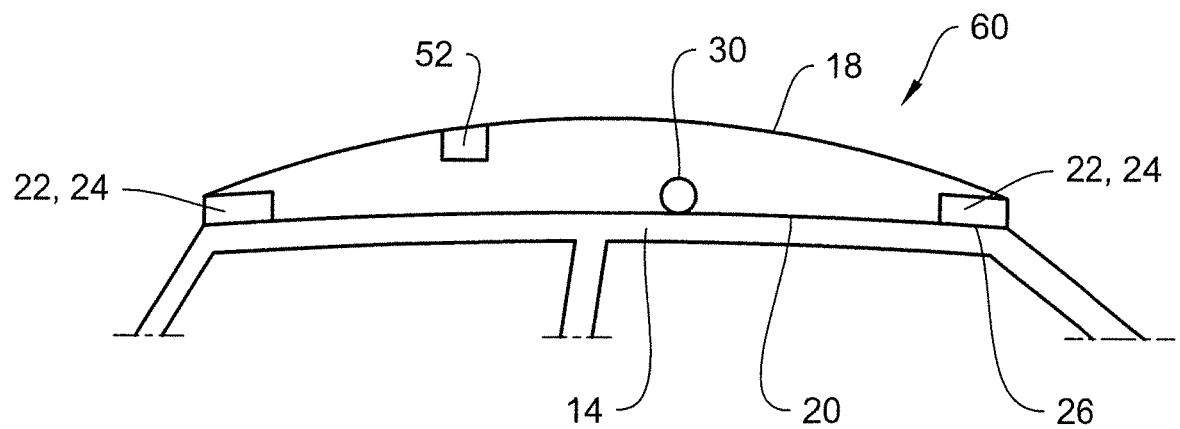
FIG. 5 is a longitudinal section through another embodiment of a roof module according to the invention.

FIG. 5 shows a roof module 60, which is again largely identical to the roof module of FIGS. 1 and 2 but differs from it in that it comprises a vibration generator 52 instead of loudspeakers as means for generating sound, vibration generator 52 being connected to the underside of roof skin 18 in a central area and being capable of causing roof skin 18 to vibrate when activated by the controller of the means for autonomous driving of the vehicle in question, roof skin 18 thus emitting a noise of a desired frequency. Roof module 60 has an insulation layer 62 made of foam or the like in order to insulate a vehicle interior from said noise.

Roof module 60 is otherwise identical to the roof module of FIGS. 1 and 2, which why reference is again made to the description thereof.

The invention claimed is:

1. A roof module for a motor vehicle, the roof module comprising:
   the roof module configured to be placed on vehicle roof side beams, the side beams being part of a vehicle body,
   the roof module, the vehicle side beams and vehicle body forming a vehicle body shell,
   the roof module having a roof skin with a smooth continuous surface and
   a roof substructure
   as well as a means for autonomous driving or semi-autonomous driving of the motor vehicle,
   said means comprising at least one sensor module having at least one environmental sensor for detecting a vehicle environment,
   the sensor module being covered by the roof skin, and
   means for generating sound which are covered by the roof skin, and
   means for recording sound which are covered by the roof skin,
   wherein the environmental sensor and the means for generating sound and the means for recording sound are connected to a controller which is part of the means for autonomous driving or semi-autonomous driving of the motor vehicle,
   wherein the means for generating sound and the means for recording sound are part of the means for autonomous driving or semi-autonomous driving of the motor vehicle,
   wherein the means for generating sound are configured to provide audible sound to other road users, wherein the audible sound is selected from the group consisting of speech, standard driving sound, motor sound, warning signals, and combinations thereof, and
   wherein the means for recording sound is configured to detect traffic situations in cooperation with the controller of the means for autonomous driving or semi-autonomous driving and other vehicles based on their noise behavior.

2. The roof module according to claim 1, wherein the means for generating sound comprise at least one loudspeaker.

3. The roof module according to claim 1, wherein the means for generating sound comprise a vibration generator.

4. A roof module for a motor vehicle, the roof module comprising:
   the roof module configured to be placed on vehicle roof side beams, the side beams being part of a vehicle body,
   the roof module, the vehicle side beams and vehicle body forming a vehicle body shell,
   the roof module having a roof skin with a smooth continuous surface and
   a roof substructure
   as well as a means for autonomous driving or semi-autonomous driving of the motor vehicle,
   said means comprising at least one sensor module having at least one environmental sensor for detecting a vehicle environment,
   the sensor module being covered by the roof skin, having means for generating sound which are covered by the roof skin and means for recording sound which are covered by the roof skin,
   wherein the environmental sensor and the means for generating sound and the means for recording sound are connected to a controller which is part of the means for autonomous driving or semi-autonomous driving of the motor vehicle, and
   wherein the means for generating sound and the means for recording sound are part of the means for autonomous driving or semi-autonomous driving of the motor vehicle,
   wherein the means for generating sound comprise a vibration generator,
   wherein the vibration generator is coupled with the roof skin and configured to vibrate the roof skin, wherein the roof skin vibrations are audible outside the motor vehicle,
   wherein the means for generating sound are configured to provide audible sound to other road users, wherein the audible sound is selected from the group consisting of speech, standard driving sound, motor sound, warning signals, and combinations thereof, and
   wherein the means for recording sound is configured to detect traffic situations in cooperation with the controller of the means for autonomous driving or semi-autonomous driving and other vehicles based on their noise behavior.

5. A roof module for a motor vehicle, the roof module comprising:
   the roof module configured to be placed on vehicle roof side beams, the side beams being part of a vehicle body,
   the roof module, the vehicle side beams and vehicle body forming a vehicle body shell,
   the roof module having a roof skin with a smooth continuous surface and
   a roof substructure
   as well as a means for autonomous driving or semi-autonomous driving of the motor vehicle,
   said means comprising at least one sensor module having at least one environmental sensor for detecting a vehicle environment,
   the sensor module being covered by the roof skin, and
   means for generating sound which are covered by the roof skin and
   means for recording sound which are covered by the roof skin, wherein the environmental sensor and the means for generating sound and the means for recording sound are connected to a controller which is part of the means for autonomous driving or semi-autonomous driving of the motor vehicle, wherein the means for generating sound and the means for recording sound are part of the means for autonomous driving or semi-autonomous driving of the motor vehicle, wherein the means for generating sound are configured to provide audible sound to other road users, wherein the audible sound is selected from the group consisting of speech, standard driving sound, motor sound, warning signals, and combinations thereof, and wherein the means for recording sound is configured to detect traffic situations in cooperation with the controller of the means for autonomous driving or semi-autonomous driving and other vehicles based on their noise behavior, wherein acoustic insulation is disposed between the roof skin and a roof headliner, wherein the acoustic insulation is configured to insulate a vehicle interior from sound generated by the means for generating sound, the roof headliner forming a roof module underside.

6. A motor vehicle comprising a roof module according to claim 1.

7. The motor vehicle according to claim 6, wherein the motor vehicle comprises an electric motor as a drive.

8. The roof module according to claim 1, wherein the motor vehicle is a passenger vehicle.

9. The roof module according to claim 1, wherein the means for generating sound to communicate with other road users is configured to communicate at least one of voice instructions, confirmations, requests, and to communicate with visually impaired road users.

10. The roof module according to claim 1, wherein the means for recording sound in cooperation with a control unit is configured to detect at least one of ambulances, police officers, pedestrians and other people or objects emitting sound, which are analyzed to interact between the vehicle and the environment based on an exchange of sounds.

11. A roof module for a motor vehicle, the roof module comprising:

the roof module configured to be placed on vehicle roof side beams, the side beams being part of a vehicle body, the roof module, the vehicle side beams and vehicle body forming a vehicle body shell, the roof module having a roof skin with a smooth continuous surface and a roof substructure as well as a means for autonomous driving or semi-autonomous driving of the motor vehicle, said means comprising at least one sensor module having at least one environmental sensor for detecting a vehicle environment, the sensor module being covered by the roof skin, and means for generating sound which are covered by the roof skin and means for recording sound which are covered by the roof skin, wherein the environmental sensor and the means for generating sound and the means for recording sound are connected to a controller which is part of the means for autonomous driving or semi-autonomous driving of the motor vehicle, and wherein the means for generating sound and the means for recording sound are part of the means for autonomous driving or semi-autonomous driving of the motor vehicle, wherein the means for generating sound comprise a vibration generator, wherein the vibration generator is coupled with a roof component and configured to vibrate the roof component, wherein the roof component vibrations are audible outside the motor vehicle, wherein the means for generating sound are configured to provide audible sound to other road users, wherein the audible sound is selected from the group consisting of speech, standard driving sound, motor sound, warning signals, and combinations thereof, and wherein the means for recording sound is configured to detect traffic situations in cooperation with the controller of the means for autonomous driving or semi-autonomous driving and other vehicles based on their noise behavior.

12. The roof module according to claim 11, wherein the roof component is at least one of a lid of a sensor, an antenna, and a panel.

13. A roof module for a motor vehicle, the roof module comprising:

the roof module configured to be placed on vehicle roof side beams, the side beams being part of a vehicle body, the roof module, the vehicle side beams and vehicle body forming a vehicle body shell, the roof module having a roof skin with a smooth continuous surface and a roof substructure as well as a means for autonomous driving or semi-autonomous driving of the motor vehicle, said means comprising at least one sensor module having at least one environmental sensor for detecting a vehicle environment, the sensor module being covered by the roof skin, and means for generating sound which are covered by the roof skin and means for recording sound which are covered by the roof skin, wherein the environmental sensor and the means for generating sound and the means for recording sound are connected to a controller which is part of the means for autonomous driving or semi-autonomous driving of the motor vehicle, wherein the means for generating sound and the means for recording sound are part of the means for autonomous driving or semi-autonomous driving of the motor vehicle, wherein the means for generating sound are configured to provide audible sound to other road users, wherein the audible sound is selected from the group consisting of speech, standard driving sound, motor sound, warning signals, and combinations thereof, wherein the means for recording sound is configured to detect traffic situations in cooperation with the controller of the means for autonomous driving or semi-autonomous driving and other vehicles based on their noise behavior;

wherein the means for generating sound comprise a vibration generator; and wherein the vibration generator which is bonded to the roof skin and configured to cause the roof skin to vibrate in such a manner that the roof skin vibration emits audible sounds.

14. The roof module of claim 13, wherein the vibration generator is bonded under the roof skin.

15. A motor vehicle, comprising a roof module according to claim 1.

* * * * *